US012785937B2

(12) United States Patent
Choukroun et al.

(10) Patent No.: US 12,785,937 B2
(45) Date of Patent: Nov. 3, 2026

(54) DEVICE MANAGED CRYPTOGRAPHIC KEYS

(71) Applicant: Apple Inc., Cupertino, CA (US)

(72) Inventors: Jonathan L. Choukroun, San Diego, CA (US); Elliot S. Briggs, Carmel, CA (US); Marcos Caceres, Prahran (AU); Simon J. Gornall, San Jose, CA (US); Michael J. Hashe, New Haven, CT (US); Graham S. Orndorff, Aptos, CA (US); Andrew M. Pace, Gloucestershire (GB); Yannick L. Sierra, San Francisco, CA (US); Catherine Yun, Woodside, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 18/907,189

(22) Filed: Oct. 4, 2024

(65) Prior Publication Data

US 2025/0119273 A1 Apr. 10, 2025

Related U.S. Application Data

(60) Provisional application No. 63/588,506, filed on Oct. 6, 2023.

(51) Int. Cl.

*G06F 9/54* (2006.01)
*H04L 9/08* (2006.01)
*H04L 9/30* (2006.01)

(52) U.S. Cl.

CPC ............ *H04L 9/0819* (2013.01); *G06F 9/547* (2013.01); *H04L 9/3073* (2013.01)

(58) Field of Classification Search

None
See application file for complete search history.

(56) References Cited

U.S. PATENT DOCUMENTS 8,775,757 B2 7/2014 Polzin et al.
8,832,465 B2 9/2014 Gulati et al.
(Continued)

FOREIGN PATENT DOCUMENTS

WO WO-03098435 A2 * 11/2003 ........... G06F 21/602

OTHER PUBLICATIONS iOS Security Guide—White Paper, Jan. 2018, Apple Inc. pp. 1-82.

*Primary Examiner* — Paul R Fisher
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to improving key management on devices. In various embodiments, a device receives, from a browser via a key-management API supported by the device, a request for a browser session to receive access to a cryptographic key managed by the device. The key-management API of the device determines whether to grant the browser session access to the cryptographic key based on verification of a signed attestation from a server corresponding to the browser session and using metadata stored about the cryptographic key. Based on the determination, the device provides access to the cryptographic key via the key-management API. In some embodiments, providing access to the cryptographic key includes performing a requested cryptographic operation using the cryptographic key and without providing the cryptographic key to the browser. In some embodiments, the cryptographic key is managed by an operating system, a secure element, or another application of the device.

20 Claims, 8 Drawing Sheets

(56) References Cited

U.S. PATENT DOCUMENTS

| | | | |
|---|---|---|---|
| 8,873,747 | B2 | 10/2014 | Polzin et al. |
| 9,043,632 | B2 | 5/2015 | Machnicki et al. |
| 9,047,471 | B2 | 6/2015 | Polzin et al. |
| 9,547,778 | B1 | 1/2017 | Paaske et al. |
| 9,645,630 | B2 | 5/2017 | Keil et al. |
| 10,079,677 | B2 | 9/2018 | Benson et al. |
| 10,153,907 | B2 * | 12/2018 | Xu .......................... H04L 63/12 |
| 11,736,489 | B2 * | 8/2023 | Borkar ................ G06F 9/44526 |
| 12,067,119 | B1 * | 8/2024 | Brandwine ......... G06F 9/45558 |
| 2013/0308838 | A1 | 11/2013 | Westerman et al. |
| 2018/0349608 | A1 | 12/2018 | de Cesare et al. |
| 2019/0123895 | A1 * | 4/2019 | Blake .................... H04L 9/0637 |
| 2021/0406386 | A1 * | 12/2021 | Ortiz ...................... G06N 20/00 |

* cited by examiner

DEVICE MANAGED CRYPTOGRAPHIC KEYS

The present application claims priority to U.S. Prov. Appl. No. 63/588,506, entitled "Device Managed Cryptographic Keys," filed Oct. 6, 2023, which is incorporated by reference herein in its entirety.

BACKGROUND

Technical Field

This disclosure relates generally to computer security, and, more specifically, to improving key management on devices.

Description of the Related Art

Web browsers frequently rely on cryptographic keys to establish encrypted and authenticated connections via the Internet. For example, when a browser requests a web page from a server supporting Hypertext Transfer Protocol Secure (HTTPS), the browser may establish a transport layer security (TLS) session to communicate secure traffic. To establish this session, the browser may initially obtain the server's digital certificate, which contains the server's public key and identity information about the server. The browser then verifies the certificate's validity before using the server's public key and its own private key in a key exchange to establish a session key used to encrypt and decrypt communicated traffic.

DETAILED DESCRIPTION

Web browsers typically provide support for web applications to perform various cryptographic operations. For example, the World Wide Web Consortium (W3C) defines an application programing interface (API) called Web Crypto that allows web applications to request cryptographic operations using JavaScript® calls. In this approach, however, the browser is responsible for managing cryptographic keys. This potentially leaves cryptographic keys more vulnerable as a browser is merely a user application executing in user space and thus offers less security than other components of a computing device such as the device's operating system protected in kernel space or secured hardware.

The present disclosure describes embodiments in which a device implements a key-management API for offloading key management to the device in a manner that is more secure than relying on, for example, a browser to manage keys. As will be discussed, a user may initiate a browser session by opening a browser tab and navigating to a website that instantiates a local web applet (or webpage, plugin, etc.) executing within the browser. If the applet asks the browser to perform a cryptographic operation (e.g., encryption, decryption, keyed hashing, signing, and key generation), in various embodiments, the browser can submit a request via the key-management API for the browser session to be permitted use of a cryptographic key managed by the device. This API can be implemented by an operating system, a native application, middleware that can run a web browser or web application, etc. In some embodiments, the cryptographic key is managed by secure software on the device such as an operating system, credential manager, etc., which may also be responsible for presenting the API. In other embodiments, the cryptographic key is managed by secure hardware such as a secure element.

Figure 1:
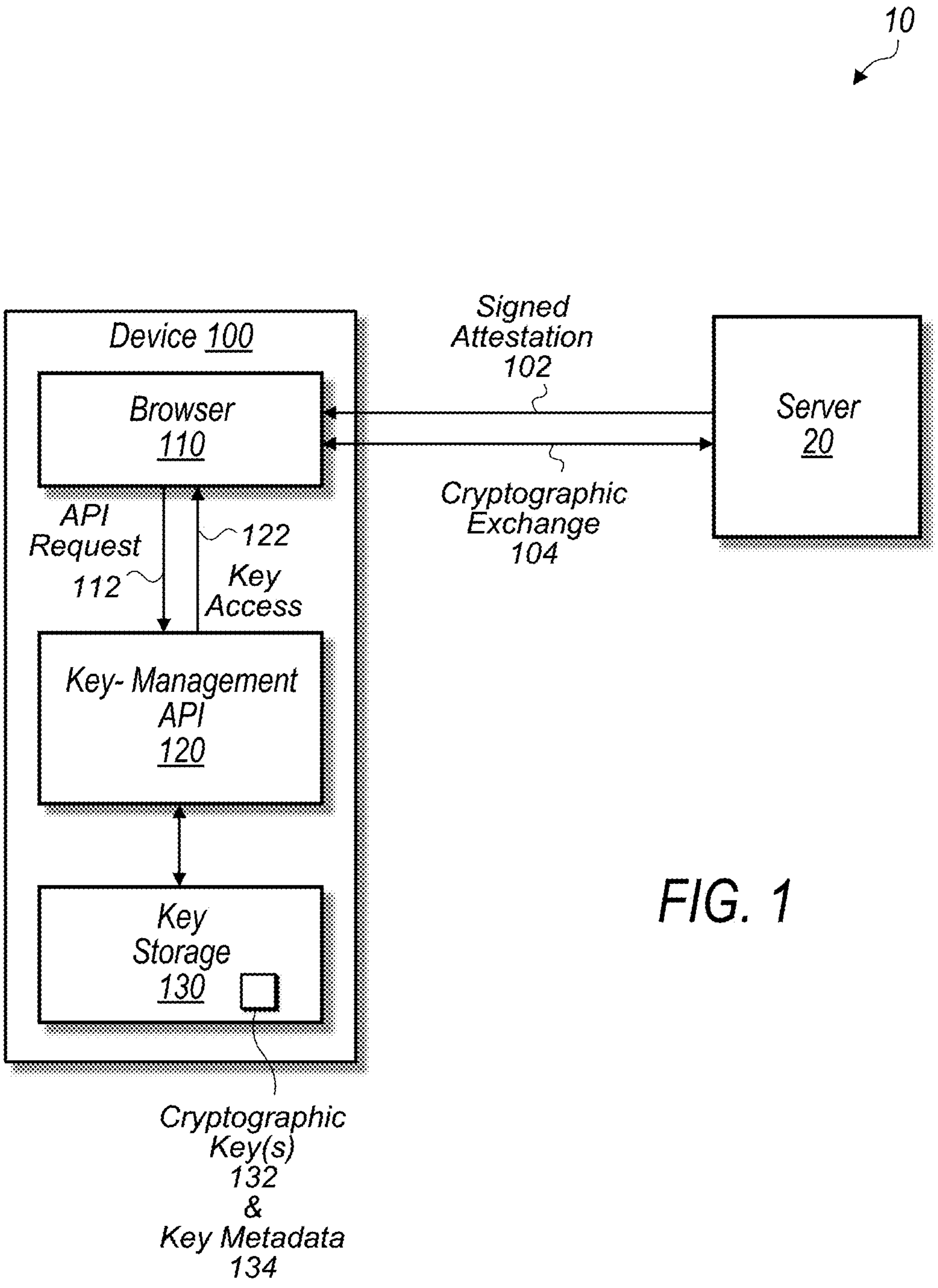
FIG. 1 is a block diagram illustrating an example of a device implementing a key-management application programing interface (API) for offloading key management to the device, in accordance with some embodiments.

Turning now to FIG. 1, a block diagram of a key management system 10 is depicted. In the illustrated embodiment, system 10 includes server 20 and device 100, which includes a browser 110, a key-management API 120, and a key storage 130. In some embodiments, system 10 is implemented differently than shown such as including an exchange with a device other than server 20, using an application other than browser 110, etc.

Browser 110 is an application executable to access various remote services, which may be located across the Internet and hosted on server computing systems such as server 20. Browser 110 may correspond to any suitable web browser such as Google Chrome®, Mozilla Firefox®, Microsoft Edge®, Safari®, and Opera®. Although described in various embodiments as a browser, browser 110, in other embodiments, may be types of applications other than a browser such as a mail client, messaging client, video conferencing application, gaming application, office suite, etc. As part of accessing services provided by server 20, browser 110 may establish a browser session via HTTP to communicate with server 20, which may include browser 110 downloading a web applet for execution locally in device 100. As noted above, this browser session may use locally stored cryptographic keys to facilitate a cryptographic exchange 104 for various proposes. For example, browser 110 may communicate via HTTPS using TLS and secured using a symmetric key implemented in accordance with Advanced Encryption Standard (AES). This symmetric key may further be derived using Elliptic-curve Diffie-Hellman (ECDH) based on a locally stored asymmetric key pair of device 100. Browser 110 may also authenticate with server 20 by signing a challenge issued by server 20 using a locally stored private key using digital signature algorithm (DSA). This asymmetric key pair may further be certified by a certificate authority (CA). As noted above, allowing a browser 110 to directly manage these cryptographic keys may make them more vulnerable to being compromised.

Key-management API 120 is a set of program instructions executable to separately manage cryptographic keys 132 used by browser 110 (or an applet executing within browser 110). API 120 may be implemented by any suitable entity that can offer greater security for keys 132. In some embodiments, API 120 is integrated into an operating system of device 100 that can restrict access to keys 132. In some embodiments, API 120 is provided by a credential manager that encrypts keys 132. In some embodiments, API 120 is implemented by hardware of device 100 such as cryptographic dongle, a secure element as discussed FIGS. 2B and 6, etc. In the illustrated embodiment, API 120 maintains cryptographic keys 132 in a key storage 130, which may not be directly accessible to browser 110. For example, key storage 130 may be encrypted, reside in a portion of memory that is not directly addressable by browser 110 such as in a portion of kernel space, reside in a portion of user space not mapped into the region of memory accessible to browser 110, etc. In some embodiments, key storage 130 is a memory that is separately controlled by hardware such as a cryptographic dongle, a secure element, etc.

As shown, browser 110 (or an applet executing within browser 110) may request access to a cryptographic key 132 by providing an API request 112 to API 120. In some embodiments, API 120 provides key access 122 to a cryptographic key 132 by performing a cryptographic operation specified in request 112 using the cryptographic key 132 but without providing the cryptographic key 132 to browser 110—thus preventing a compromised browser 110 from exporting the cryptographic key 132. Such an API request 112 may include any of various suitable inputs such as an identifier of the relevant cryptographic key, the type of requested operation (e.g., sign, decrypt, encrypt, verify signature, etc.), any data to be operated on such as to produce an encrypted result, a signature, a decrypted result, a verification result, etc. In other embodiments, however, providing key access 122 can include providing the cryptographic key 132 to a browser 110. In some embodiments, API 120 can receive an API request 112 from a particular browser session (e.g., associated with a webpage, a web applet, a plugin, etc.) and provide key access 122 to only a particular browser tab associated with the browser session (and not any other tabs opened in browser 110). In some embodiments, API 120 can be used by a browser session to access a cryptographic key established by a separate application such as a browser session of a streaming service being able to use a key established by the corresponding application of the service.

In order to prevent unauthorized access to a given cryptographic key 132, in various embodiments, API 120 determines whether to grant key access 122 to the cryptographic key 132 based on a verification of a signed attestation 102 associated with server 20. Signed attestation 102 may take any of various suitable forms such as signed X.509 certificate of server 20, a signed token, a digital signature generated by server 20 using a private key and in response to an issued challenge by browser 110, etc.—and may generally be indicative of a trustworthiness associated with server 20. In some embodiments, API 120 predicates providing key access 122 based on one or more additional factors such as receiving user approval, performing a user authentication of a user of the device 100, etc. In some embodiments, verification of a received signed attestation 102 is performed using metadata 134 stored about a given cryptographic key 132 when a key 132 is initially created in key storage 130.

Key metadata 134 includes various contextual information about a given cryptographic key 132. For example, key metadata 134 may identify the type of key/its intended use such as an AES key, RSA private key, DSA key, ECDH key, etc. Key metadata 134 may also include metadata indicative of the identity of server 20 and usable to verify attestation 102 such as a domain identifier, an internet protocol (IP) address, application identifier, previously received certificate, public key of server 20, etc. stored when an API request 112 was received to create the cryptographic key 132. For example, in an embodiment in which a signed attestation 102 includes a digital signature generated by a private key of server 20, validation of the signature may include retrieving a certificate from metadata 134 including the public key of server 20 and validating the signature using the public key. In some embodiments, key metadata 134 can include one or more usage criteria restricting when access 122 to a particular key 132 can be provided. This criteria may include temporal restrictions, location restrictions, various conditions to be satisfied (e.g., a successful user authentication), identities of other applications authorized to access keys 132, etc. In some embodiments in which a cryptographic key 132 is a private key of an asymmetric key pair, key metadata 134 can include a certificate including the corresponding public key. Accordingly, in response to receiving an API request 112 to generate a certified public key pair, API 120 may generate (or cause generation of) the key pair including issuing a certificate signing request (CSR) to a CA to receive a corresponding certificate certifying the key pair. In such an embodiment, providing access to private key may include using the private key to perform a cryptographic operation and returning, to browser 110, a result of the cryptographic operation along with the certificate.

In some embodiments, API 120 can also provide various notifications to the user independent of browser 110 in order to make the user aware when cryptographic keys 132 are being used. For example, an initial provided notification may inform the user that cryptographic keys 132 can be separately managed by device 100 through API 120 (as opposed to using a key maintained within browser 110). Another API notification may be provided when an API request 112 is received—and potentially after verifying server 20's signed attestation 102. Such a notification may ask for a user input such as selecting a particular cryptographic key, providing user authentication information, providing a biometric credential, etc. In other embodiments, API 120 may automatically provide access to a key stored by hardware without notifying the user—or employ other techniques to avoid constantly bombarding the user with notifications.

Different approaches to verifying a signed attestation 102 before granting access to cryptographic keys 132 will now be discussed with respect to FIGS. 2A and 2B.

Figure 2A:
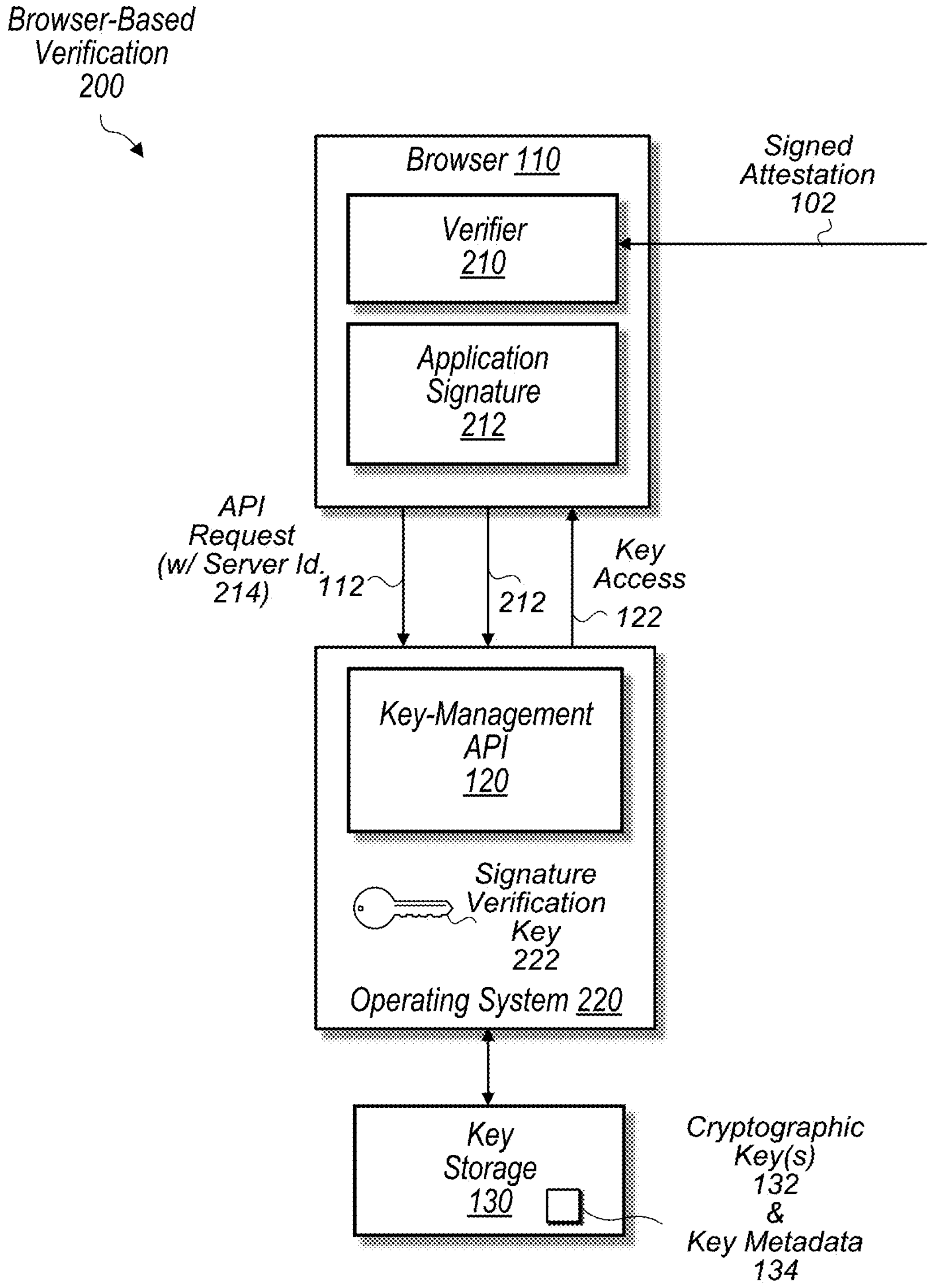
FIGS. 2A and B are block diagrams illustrating examples of API exchanges that includes a browser-based attestation verification or an API-based attestation verification, in accordance with some embodiments.

Turning now to FIG. 2A, a block diagram of a browser-based verification 200 of a signed attestation 102 is depicted. In the illustrated embodiment, browser 110 includes a verifier 210 and an application signature 212. Key-management API 120 is further included within an operation system 220 of device 100 having a signature verification key 222.

Verifier 210 is a set of program instructions executable to verify a signed attestation 102 from server 20. In particular, verifier 210 may receive a public key of server 20, which may be included in a certificate associated with server 20's identity. Verifier 210 may also store a certificate for a trusted CA that issued the server certificate. In response to receiving attestation 102, verifier 210 may verify the chain of trust by using the public key in the CA certificate to verify the contents of the server certificate including the server's public key. Verifier 210 may then verify the signature of the attestation 102 using server 20's public key. If verification of the signed attestation 102 is successful, browser 110 may issue an API request 112 to key-management API 120. In the illustrated embodiment, browser 110 is trusted to reliably verify the signed attestation 102 due to its application signature 212.

Operating system (OS) 220 is executable to manage various operations of computing device 100 including enforcing various security restrictions for device 100. In some embodiments, one of these security restrictions is verifying the integrity of application program instructions before permitting an application, such as browser 110, to execute. In such an embodiment, a developer of browser 110 (or manufacturer of device 100) may sign the program instructions of browser 110 with a private key to produce application signature 212. OS 220 may be provided with the corresponding public key, shown as signature verification key 222, which can be used to verify the program instructions against signature 212 in order to determine that the program instructions have not been modified in an unauthorized manner—potentially compromising the ability of verifier 210 to accurately verify a signed attestation 102. If application signature 212 is successfully verified indicating that the integrity of browser 110 has been preserved, OS 220 may allow browser 110 to execute and, thus, issue API 112 requests for keys 132.

In response to receiving an API request 112 for particular key 132, OS 220 may determine to grant key access 122. In some embodiments, access 122 can include OS 220 accessing key storage 130 in a region of memory inaccessible to browser 110, decrypting key storage 130, etc. As noted above, access 122 may include performing some requested action using the key 132 and specified in the request 112 (as opposed to providing the key 132 to browser 110). As multiple keys 132 may be included in key storage 130, browser 110 may include various metadata in its request 112 to enable OS 220/API 120 to determine the relevant key 132. In the illustrated embodiment, this metadata includes a server identifier 214, which may be obtained from attestation 102 and is indicative of an identity associated with server 20 such as its IP address, domain identifier, public key, etc. OS 220/API 120 may then compare this metadata with key metadata 134, which may be bound to the cryptographic key 132 at creation of the cryptographic key 132. If the comparison is successful, API 120 may provide corresponding key access 122 for the relevant key 132. In some embodiments, API request 112 is accompanied with the process identifier (PID) of the browser thread issuing the request 112 and rendering a particular browser tab, so that OS 220 can provide key access 122 to only that thread—thus permitting access of the key 132 to only that particular browser tab associated with the browser session.

In some embodiments, verification 200 may be implemented differently than shown such as API 120 being located externally to OS 220. A verification of signed attestation 102 may also be performed by an entity other than browser 110 as will be discussed next.

Figure 2B:
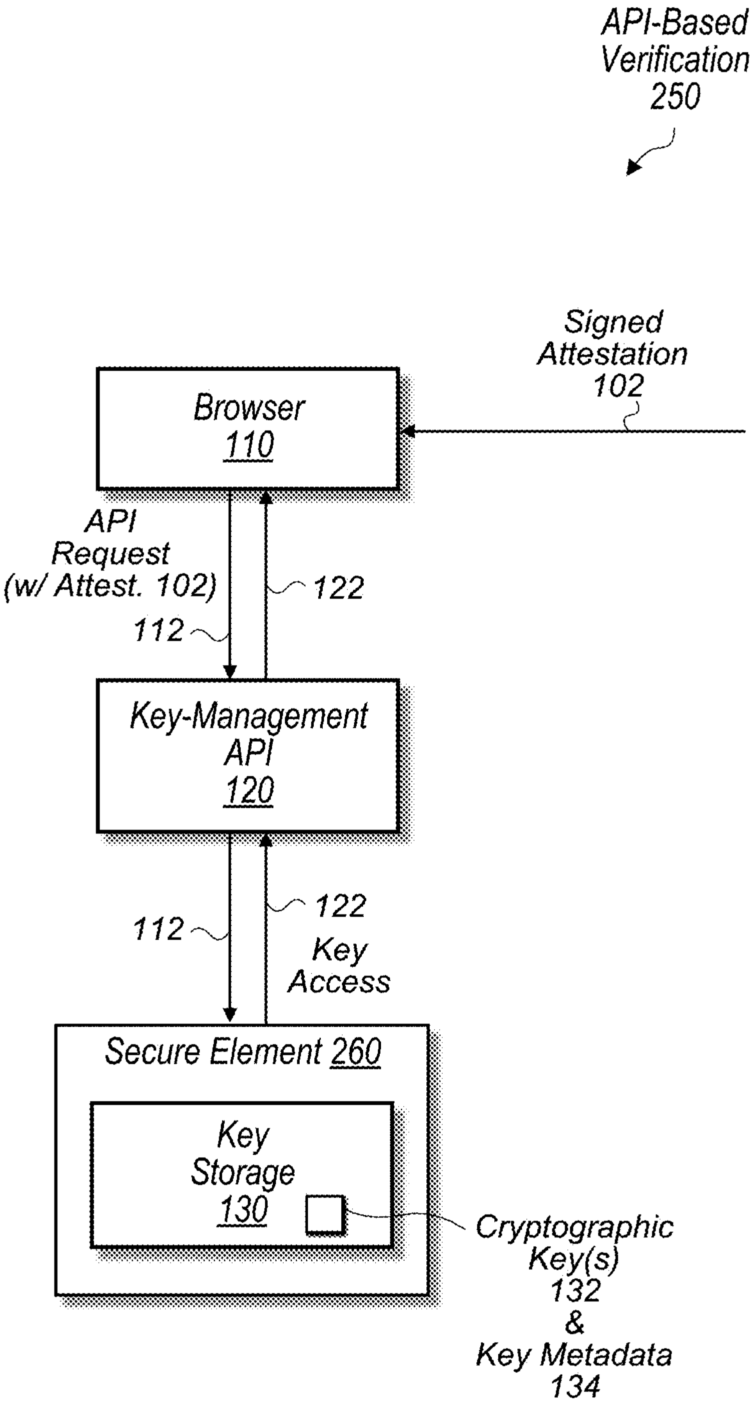

Turning now to FIG. 2B, a block diagram of an API-based verification 250 is depicted. In the illustrated embodiment, verification 250 includes an exchange in which browser 110 provides the signed attestation 102 with its API request 112 to key-management API 120. API 120, in turn, may provide the request 112 to a secure element 260, which maintains key storage 130. As used herein, the term "secure element" (or "secure circuit") refers to a circuit that protects an isolated, internal resource (such as key storage 130, cryptographic hardware using keys 132, etc.) from being directly accessed by an external circuit such as the processors executing browser 110.

In the illustrated embodiment, secure element 260 is responsible for verifying a signed attestation 102, which may be performed as discussed above. If the verification is successful, in some embodiments, secure element 260 provides key access 122 by accessing an internal memory implementing key storage 130 and using internal cryptographic circuitry to perform a requested cryptographic operation using key 132. In another embodiment, key storage 130 may be external to secure element 260 such as being stored in device 100's main non-volatile memory (NVM); however, key storage 130 may be encrypted using an encryption key persisted in only an internal memory of secure element 260. In response to receiving a request 112, secure element 260 may retrieve the key 132 from storage 130, decrypt it using the internal encryption key, and perform the cryptographic operation using internal cryptographic circuitry—thus preventing the key 132 from being exposed in unencrypted form outside of secure element 260. Various additional techniques used by secure element 260 to prevent direct access to keys 132 will be discussed in greater detail with FIG. 6.

In other embodiments, signed attestation 102 may be verified by API 120 or OS 220 as discussed above, which may then send, to secure element 260, a request 112 with metadata to look up the appropriate key 132 such as server identifier 214. In some embodiments, browser 110 may still verify signed attestation 102 but may forward the verified attestation 102 to API 120, which may itself verify the attestation again or provide it to OS 220 or secure element 260 for a second verification. In such embodiment, a browser 110 perform a first verification of signed attestation 102 in order to determine whether to continue communicating with server 20, but OS 220 or secure element 260 may perform a second verification of attestation 102 before granting key access 122 as an added layer of security.

As will be discussed next, API 120 can also provide access to keys 132 stored on other devices such as those associated with the same user. For example, if the device does not store a key locally, API 120 can use a key stored on another one of the user's devices (or copy the key from another device and then use it locally). In some embodiments, a key recovery operation can be performed if a requested key has been removed.

Figure 3:
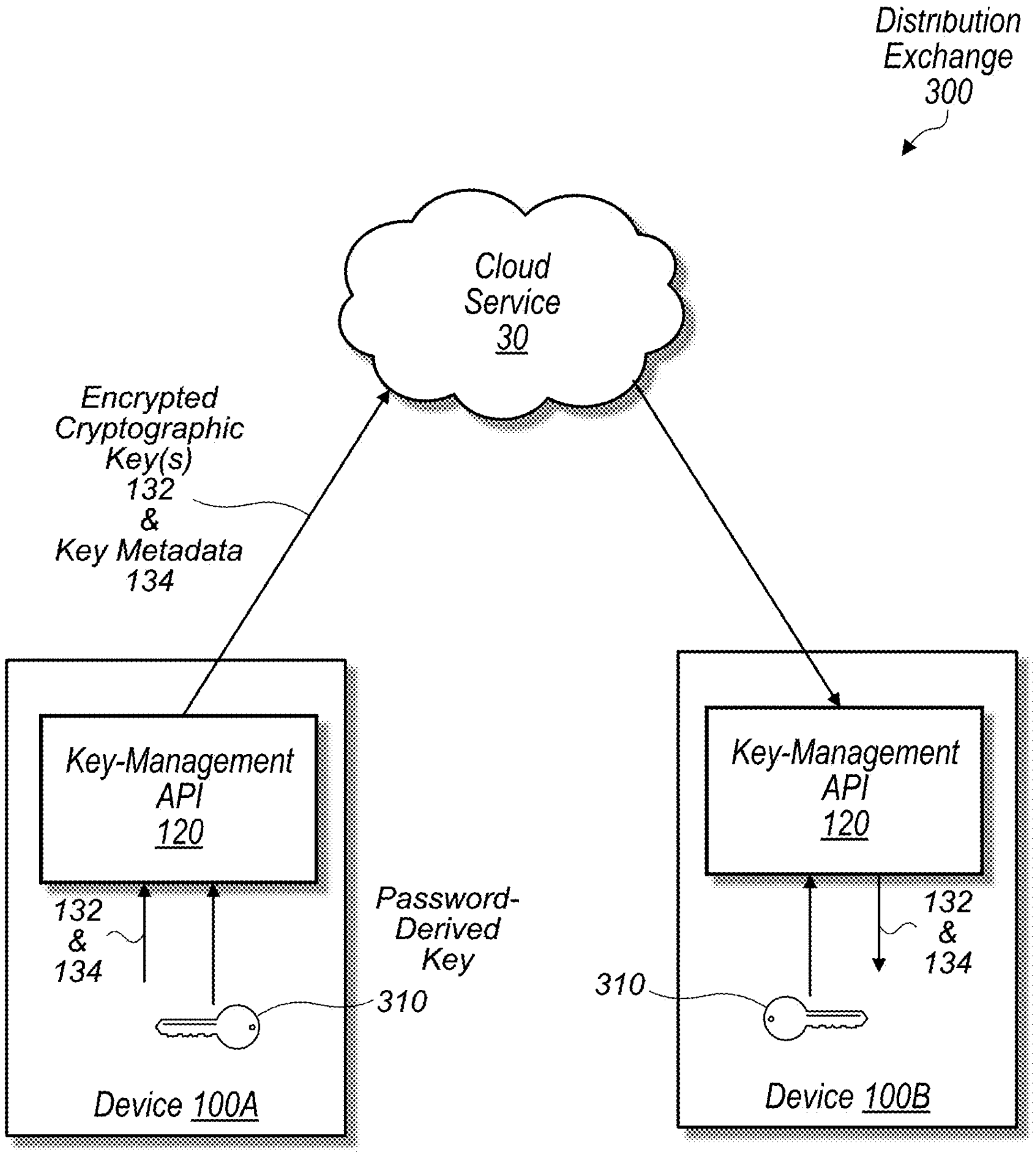
FIG. 3 is a block diagram illustrating an example of an API exchange to share managed keys across multiple devices, in accordance with some embodiments.

Turning now to FIG. 3, a block diagram of a key distribution exchange 300 is depicted. In the illustrated embodiment, exchange 300 is between multiple devices 100A and 100B via a cloud service 30. In other embodiments, exchange 300 may be performed differently such as directly via an ad-hoc wireless network between devices 100 and independently of cloud service 30.

Cloud service 30 is a computer cluster accessible via a network connection and providing various services to devices 100 such as synchronizing information between devices 100. As shown, an instance of API 120 on device 100A can retrieve a set of cryptographic keys 132 and key metadata 134 and encrypt them using a cryptographic key 310 before sending them to cloud service 30. In the illustrated embodiment, cryptographic key 310 is a password-derived key 310, which may be derived from a user password used to access device 100A or to access cloud service 30; however, in other embodiments, encrypted keys and metadata 134 may secured differently. After keys 132 and metadata 134 are uploaded to cloud service 30, an instance of API 120 on device 100B may retrieve the encrypted cryptographic keys 132 and metadata 134 and decrypt them via key 310. As used herein, "using" a cryptographic key to decrypt or encrypt includes 1) decrypting and encrypting with that key and 2) decrypting and encrypting another key used to perform encryption or decryption of data. In some embodiments, cloud service 30 may authenticate devices 100A and 100B before allowing them to participate in exchange 300. Cloud service 30 may further require them to be associated with the same user account tied to service 30—or confirm that a first user account associated device 100A has authorized a second user account associated with device 100B to receive keys 132 and metadata 134.

In addition to distributing new keys 132 and metadata 134, cloud service 30 may be used to recover keys 132 and metadata 134 on a device 100. In some embodiments, this may be performed in a similar manner described above with exchange 300 in which device 100B recovers a lost or invalid key 132 by determining that device 100A includes the desired key 132 and pulling the key 132 and metadata 134 via cloud service 30. In other embodiments, rather than propagating a copy of key 132 stored on device 100A, device 100B may request via cloud service 30 that device 100A use a key 132 associated with a particular server 20 to attest to a new key 132 generated by device 100B. For example, device 100A may sign an attestation for the newly generated key 132, such as a certificate, in order to attest to the trustworthiness of the new key 132.

Figure 4:
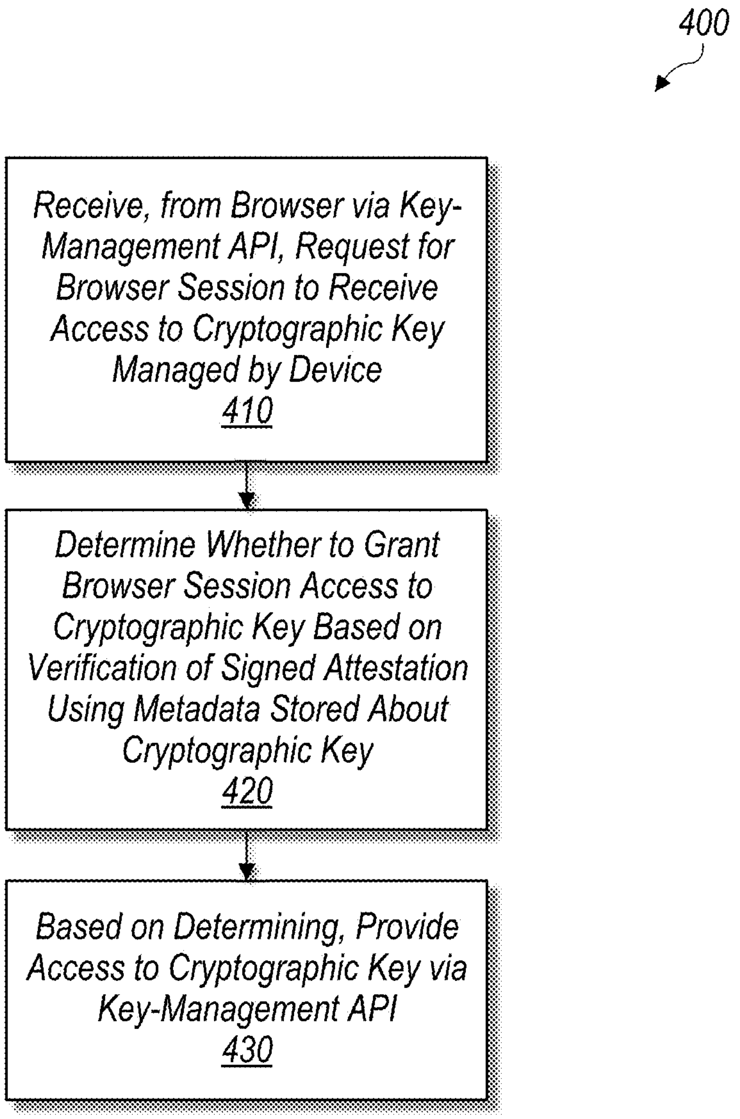
FIG. 4 is a flow diagram illustrating an example of a method performed by the device, in accordance with some embodiments.

Turning now to FIG. 4, a flow diagram of a method 400 is depicted. Method 400 is one embodiment of a method performed by a device using a key-management API such as device 100. As noted above, in some instance, performance of method 400 provides a more secure approach to managing cryptographic keys used by a browser.

In step 410, a device receives, from a browser (e.g., browser 110) via a key-management API (e.g., key-management API 120) supported by the device, a request (e.g., API request 112) for a browser session to receive access to a cryptographic key (e.g., cryptographic key 132) managed by the device. In various embodiments, the request is associated with a signed attestation (e.g., signed attestation 102) from a server (e.g., server 20) corresponding to the browser session. In some embodiments, the signed attestation is associated with a certificate bound to the cryptographic key at creation of the cryptographic key.

In step 420, the key-management API of the device determines whether to grant the browser session access to the cryptographic key based on a verification of the signed attestation using metadata (e.g., key metadata 134) stored about the cryptographic key. In some embodiments, the key-management API is integrated into an operating system (e.g., operating system 220) that manages the cryptographic key. In some embodiments, the cryptographic key is stored in a secure element (e.g., secure element 260) configured to provide access to the cryptographic key via the key-management API. In some embodiments, the API request includes the signed attestation; the determining includes the key-management API performing the verification of the signed attestation. In some embodiments, the cryptographic key is created in response to a key creation request received via the key-management API; the creating includes storing contextual information restricting when the cryptographic key can be used. In some embodiments, the determining is also based on a user authentication of a user of the device.

In step 430, based on the determining, the device provides access (e.g., key access 122) to the cryptographic key via the key-management API. In some embodiments, providing access to the cryptographic key includes performing a requested cryptographic operation using the cryptographic key and without providing the cryptographic key to the browser. In some embodiments, providing access to the cryptographic key includes the device permitting access to only a particular browser tab associated with the browser session. In some embodiments, a browser session is permitted, via the key-management API, to access a cryptographic key established by a separate application than the browser. In some embodiments, the verification is a second verification of the attestation performed by the device in addition to a verification performed by the browser.

In some embodiments, method 400 further includes generating a certified public key pair having a certificate that includes a public key of the public key pair and the cryptographic key is a private key of the public key pair. In such an embodiment, providing access to the cryptographic key includes using the private key to perform a cryptographic operation requested via the key-management API and returning, to the browser, a result of the cryptographic operation. In some embodiments, method 400 includes distributing (e.g., via distribution exchange 300) the cryptographic key from the device to one or more additional devices associated with a user of the device. In some embodiments, method 400 includes performing a key recovery operation (e.g., via recovery exchange 350) for the cryptographic key based on another cryptographic key stored on another device associated with a user of the device. In some embodiments, method 400 includes, in response to receiving the request, providing a corresponding notification to a user of the device.

Example Computer System

Figure 5:
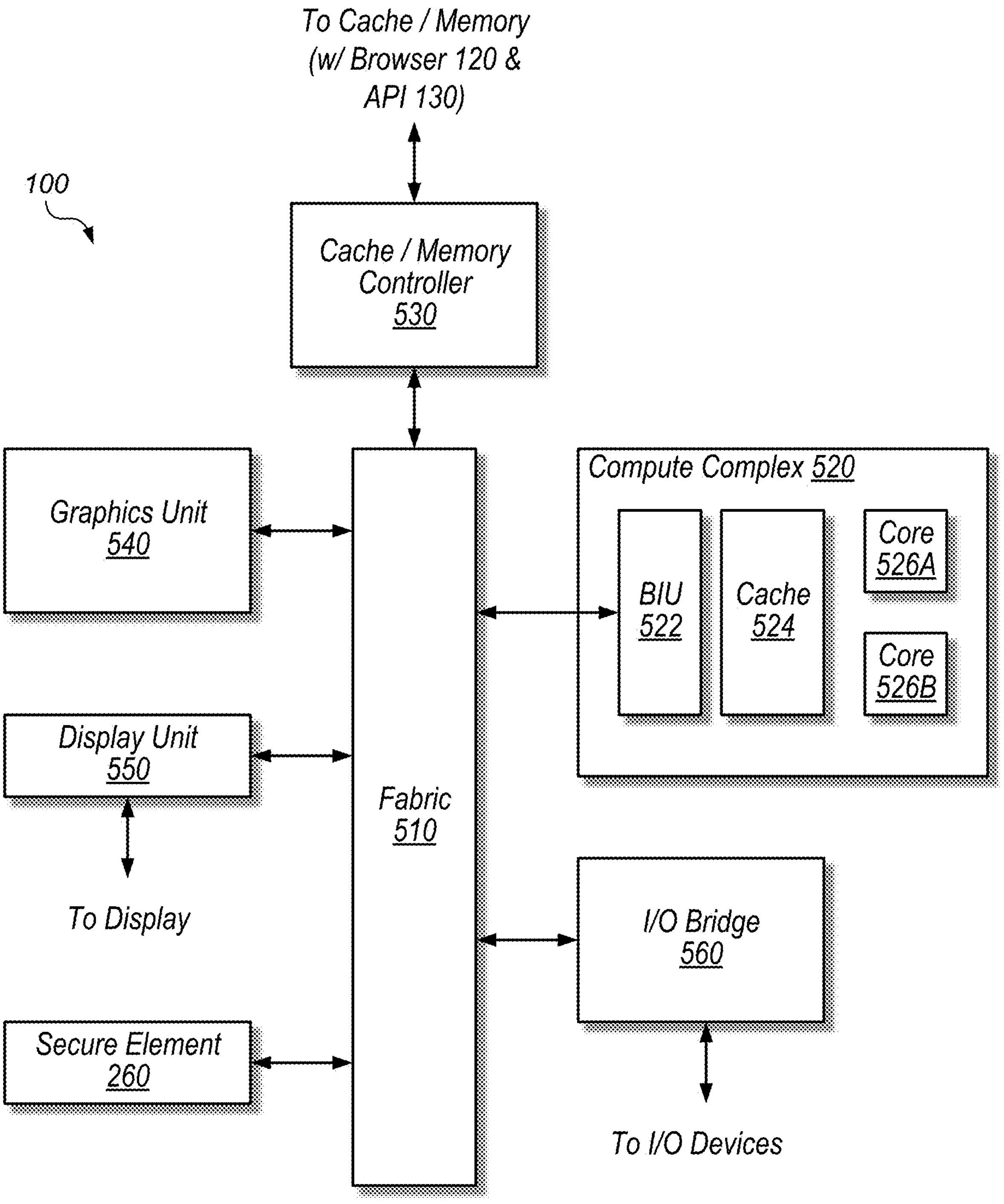
FIG. 5 is a block diagram illustrating an example computing device implementing functionality described herein, in accordance with some embodiments.

Turning now to FIG. 5, a block diagram illustrating an example embodiment of a device 100 is shown. In some embodiments, elements of device 100 may include (or be included within) a system on a chip. In some embodiments, device 100 may be included in a mobile computing device, which may be battery-powered. Therefore, power consumption by device 100 may be an important design consideration. In the illustrated embodiment, device 100 includes fabric 510, compute complex 520, cache/memory controller 530, graphics unit 540, display unit 550, input/output (I/O) bridge 560, and secure element 260. In some embodiments, device 100 may include other components (not shown) in addition to or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 100. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 522, cache 524, and cores 526A-B. In various embodiments, compute complex 520 may include various numbers of processors, processor cores and caches. For example, compute complex 520 may include 1, 2, or 4 processor cores, or any other suitable number. In one embodiment, cache 524 is a set associative L2 cache. In some embodiments, cores 526A-B may include internal instruction and data caches. In some embodiments, a coherency unit (not shown) in fabric 510, cache 524, or elsewhere in device 500 may be configured to maintain coherency between various caches of device 500. BIU 522 may be configured to manage communication between compute complex 520 and other elements of device 100. Processor cores such as cores 526A-B may be configured to execute instructions of a particular instruction set architecture (ISA) which may include operating system instructions and user application instructions. These instructions may be stored in computer readable medium such as a memory coupled to memory controller 530 discussed below.

As used herein, the term "coupled to" may indicate one or more connections between elements, and a coupling may include intervening elements. For example, in FIG. 5, graphics unit 540 may be described as "coupled to" a memory through fabric 510 and cache/memory controller 530. In contrast, in the illustrated embodiment of FIG. 5, graphics unit 540 is "directly coupled" to fabric 510 because there are no intervening elements.

Cache/memory controller 530 may be configured to manage transfer of data between fabric 510 and one or more caches and memories. For example, cache/memory controller 530 may be coupled to an L3 cache, which may in turn be coupled to a system memory. In other embodiments, cache/memory controller 530 may be directly coupled to a memory. In some embodiments, cache/memory controller 530 may include one or more internal caches. Memory coupled to controller 530 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 530 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions, such as browser 110 and key-management API 120, executable by compute complex 520 to cause device 100 to perform functionality described herein.

Graphics unit 540 may include one or more processors, e.g., one or more graphics processing units (GPUs). Graphics unit 540 may receive graphics-oriented instructions, such as OPENGL®, Metal®, or DIRECT3D® instructions, for example. Graphics unit 540 may execute specialized GPU instructions or perform other operations based on the received graphics-oriented instructions. Graphics unit 540 may generally be configured to process large blocks of data in parallel and may build images in a frame buffer for output to a display, which may be included in the device or may be a separate device. Graphics unit 540 may include transform, lighting, triangle, and rendering engines in one or more graphics processing pipelines. Graphics unit 540 may output pixel information for display images. Graphics unit 540, in various embodiments, may include programmable shader circuitry which may include highly parallel execution cores configured to execute graphics programs, which may include pixel tasks, vertex tasks, and compute tasks (which may or may not be graphics-related).

Display unit 550 may be configured to read data from a frame buffer and provide a stream of pixel values for display. Display unit 550 may be configured as a display pipeline in some embodiments. Additionally, display unit 550 may be configured to blend multiple frames to produce an output frame. Further, display unit 550 may include one or more interfaces (e.g., MIPI® or embedded display port (eDP)) for coupling to a user display (e.g., a touchscreen or an external display).

I/O bridge 560 may include various elements configured to implement: universal serial bus (USB) communications, security, audio, and low-power always-on functionality, for example. I/O bridge 560 may also include interfaces such as pulse-width modulation (PWM), general-purpose input/output (GPIO), serial peripheral interface (SPI), and inter-integrated circuit (I2C), for example. Various types of peripherals and devices may be coupled to device 100 via I/O bridge 560.

In some embodiments, device 100 includes network interface circuitry (not explicitly shown), which may be connected to fabric 510 or I/O bridge 560. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 100 with connectivity to various types of other devices and networks.

Example Secure Element

Figure 6:
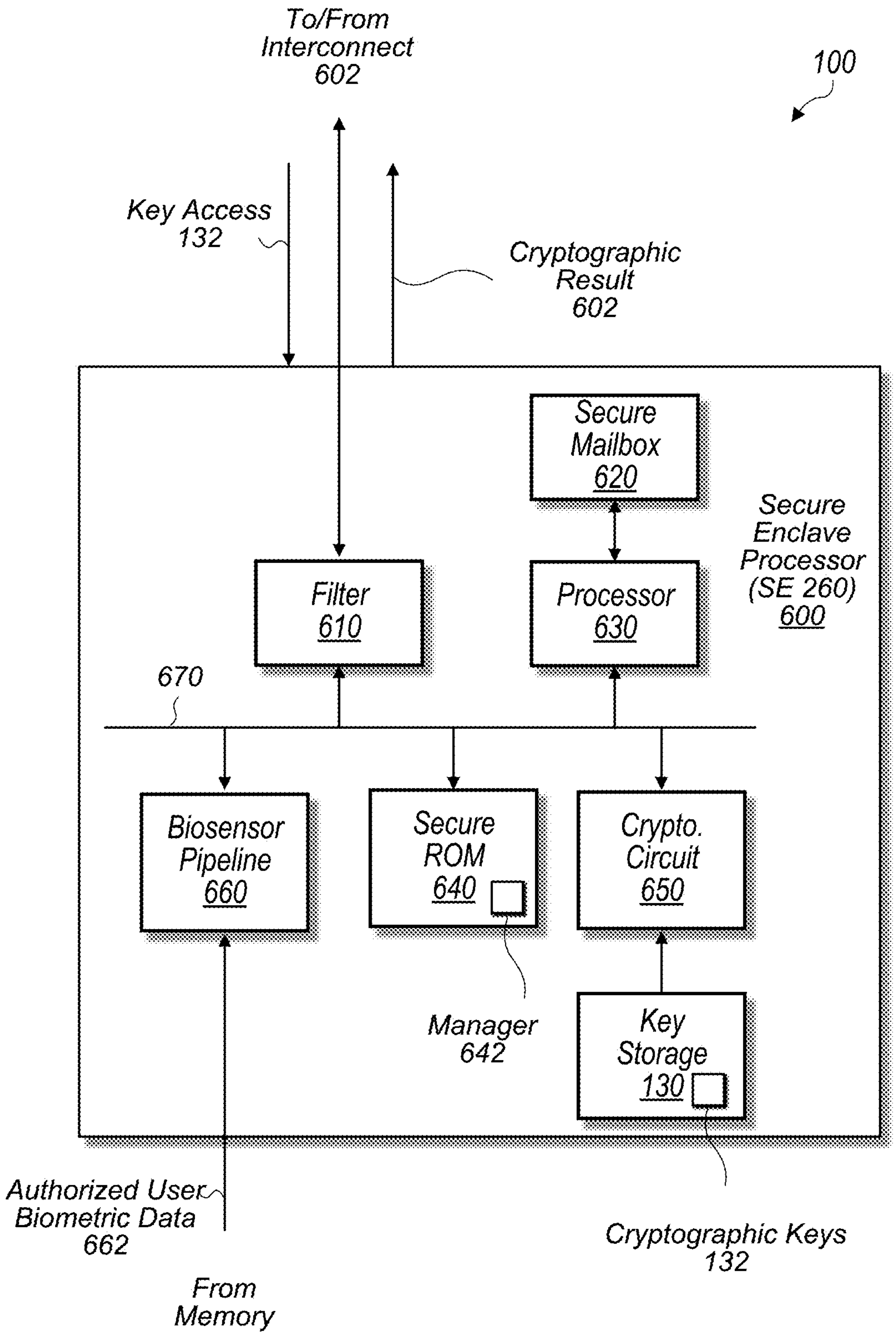
FIG. 6 is a block diagram illustrating a secure element implementing functionality described herein, in accordance with some embodiments.

Turning now to FIG. 6, a block diagram of secure enclave processor (SEP) 600 is depicted. SEP 600 is one embodiment of a secure element (such as secure element 260). In the illustrated embodiment, SEP 600 includes a filter 610, secure mailbox mechanism 620, processor 630, secure ROM 640, cryptographic circuit 650, key storage 130, and a biosensor pipeline 660 coupled together via an interconnect 670. In some embodiments, SEP 600 may include more (or less) components than shown in FIG. 6. As noted above, SEP 600 is a secure circuit, which may have tamper resistance. As discussed below, SEP 600 implements tamper resistance through the use of filter 610 and secure mailbox 620.

Filter 610 is circuitry configured to tightly control access to SEP 600 to increase the isolation of the SEP 600 from the rest of device 100, and thus the overall security of device 100. More particularly, in some embodiments, filter 610 may permit read/write operations from processors in complex 520 (or other peripherals coupled to fabric 510 in some embodiments) to enter SEP 600 only if the operations address the secure mailbox 620. Other operations may not progress from the fabric 510 into SEP 600. Even more particularly, filter 610 may permit write operations to the address assigned to the inbox portion of secure mailbox 620, and read operations to the address assigned to the outbox portion of the secure mailbox 620. All other read/write operations may be prevented/filtered by the filter 610. In some embodiments, filter 610 may respond to other read/write operations with an error. In one embodiment, filter 610 may sink write data associated with a filtered write operation without passing the write data on to local interconnect 670. In one embodiment, filter 610 may supply nonce data as read data for a filtered read operation. Nonce data (e.g., "garbage data") may generally be data that is not associated with the addressed resource within the SEP 600. Filter 610 may supply any data as nonce data (e.g. all zeros, all ones, random data from a random number generator, data programmed into filter 610 to respond as read data, the address of the read transaction, etc.). Thus, filter 610 may prevent direct access to internal components 630-670 by an external entity such as processors in complex 520.

In various embodiments, filter 610 may only filter incoming read/write operations. Thus, the components of the SEP 600 may have full access to the other components of device 100 such as memory coupled to controller 530. Accordingly, filter 610 may not filter responses from fabric 510 that are provided in response to read/write operations issued by SEP 600.

Secure mailbox 620 is circuitry that, in some embodiments, includes an inbox and an outbox. Both the inbox and the outbox may be first-in, first-out buffers (FIFOs) for data. The buffers may have any size (e.g. any number of entries, where each entry is capable of storing data from a read/write operation). Particularly, the inbox may be configured to store write data from write operations sourced from fabric 510. The outbox may store write data from write operations sourced by processor 630. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on processors in complex 520 (or other peripherals coupled to fabric 510) may request services of SEP 600 via an application programming interface (API) supported by an operating system of device 100 (which may (or may not) be a separate API than API 120)—i.e., a requester may make API calls that request services of SEP 600. These calls may cause corresponding requests to be written to mailbox mechanism 620, which are then retrieved from mailbox 620 and analyzed by processor 630 to determine whether it should service the requests. Accordingly, this API may be used to send, via mailbox 620, for example, an authentication credential received based on authentication prompt, such as a biometric credential, a passcode, etc. This API may also be used by API 120 to request access to cryptographic keys 132. By isolating SEP 600 in this manner, integrity of SEP 600 may be enhanced—including preventing, for example, a malicious process running on processor cores 526 from extracting cryptographic keys 132 in key storage 130.

SEP processor 630 is configured to process commands received from various sources in device 100 and may use various secure peripherals to accomplish the commands. Processor 630 may then execute instructions stored in ROM 640 (or elsewhere such as memory coupled to controller 530) such as key manager 642, which may facilitate generation and usage of cryptographic keys 132. For example, SEP processor 630 may execute key manager 642 to provide appropriate commands to cryptographic circuit 650 to generate and use cryptographic keys 132—and, in some embodiments, provide commands to biosensor sensor pipeline 660 to verify an authentication credential 602 if credential is a biometric credential collected by a biosensor of device 100.

Secure ROM 640 is a memory configured to store program instruction for booting SEP 600. In some embodiments, ROM 640 may respond to only a specific address range assigned to secure ROM 640 on local interconnect 670. The address range may be hardwired, and processor 630 may be hardwired to fetch from the address range at boot in order to boot from secure ROM 640. Filter 610 may filter addresses within the address range assigned to secure ROM 640 (as mentioned above), preventing access to secure ROM 640 from components external to the SEP 600. In some embodiments, secure ROM 640 may include other software executed by SEP processor 630 during use. This software may include the program instructions to process inbox messages and generate outbox messages, etc. In some embodiments, program instructions executed by SEP processor 630 are signed by a trusted authority (e.g., device 100's manufacturer) in order to ensure their integrity. These program instructions may include those stored in secure ROM 640 and program instructions stored externally such as memory coupled to controller 530; however, these externally stored program instructions may have their signatures verified by program instructions in ROM 640 prior to being permitted to be executed by processor 630.

Cryptographic circuit 650 is circuitry configured to perform cryptographic operations for SEP 600, including key generation as well as encryption and decryption using keys, which may be stored in storage 130. Cryptographic circuit 650 may implement any suitable encryption algorithm such as Data Encryption Standard (DES), Advanced Encryption Standard (AES), Rivest Shamir Adleman (RSA), etc. In some embodiments, circuit 650 may further implement elliptic curve cryptography (ECC). As noted above, circuit 650 may be responsible for generating cryptographic keys 132 and/or using keys 132. In some embodiments, circuit 650 may generate keys 132 in response to a command from manager 642 and using a random number generator (RNG) circuit, which may be included in circuit 650 or accessible to circuit 650 as a secure peripheral via interconnect 670. In some embodiments, SEP 600 may predicate use of keys 132 on a successful user authentication. Accordingly, prior to a use of key 132, device 100 may request an authentication credential. In response to receiving the requested authentication credential, SEP 600 (using key manager 642, pipeline 660, or some other component) may verify the authentication credential. In response to the verifying being successful, SEP 600 may determine to permit the use of a keys 132. As noted above, authentication credential may be a biometric credential, which may be evaluated by pipeline 660 discussed below.

In the illustrated embodiment, key storage 130 is a local memory (i.e., internal memory) of SEP 600 configured to store keys 132. In some embodiments, storage 130 may be configured such that only cryptographic circuit 650 is able to read and write data to storage 130 including keys 132. For example, while key manager 642 running on processor 630 may be able to request generation of keys 132 and performance of an action with respect to keys 132, processor 630 may not be able to read or write data to storage 130. Thus, if processor 630 were to execute compromised program instructions, processor 630 would be unable to read and write key 132 anyways as storage 130 may, for example, lack the physical read and write interfaces to facilitate such actions for processor 630. In some embodiments, cryptographic circuit 650 may access other forms of storage, which may include other non-volatile storages such as listed above with respect to FIG. 5. In some embodiments, these other storages may also include a set of fuses that are burnt during a fabrication of SEP 600 (or more generally device 100) in order to record keys such as a unique identifier (UID), which may be used derive keys described herein such as keys 132. In some embodiments, to expand its available storage, SEP 600 may store keys generated by cryptographic circuit 650 externally to SEP 600, such as in a non-volatile storage coupled to controller 530, but encrypt those keys using one or more keys stored in storage 130 or other internal storages.

Biosensor sensor pipeline 660 is circuitry configured to compare an authentication credential if it is biometric credential captured by a biosensor from a user being authenticated with a biometric credential data 662 of an authorized user. Biometric credentials may be data that uniquely identifies the user among other humans (at least to a high degree of accuracy) based on the user's physical or behavioral characteristics. In some embodiments in which a user credential is collected from a user's face, pipeline 660 may perform the comparison using a collection of neural networks included in pipeline 660, each network being configured to compare a biometric credential captured in a single frame with biometric credential data 662 captured in multiple frames for an authorized user. As shown, pipeline 660 may be configured to read, from memory, biometric credential 662, which may be protected by encryption in some embodiments and/or be stored in an associated part of memory that is only accessible to SEP 600. (In another embodiment, SEP 600 may store credential 662 internally.) Based on the comparison of biometric credentials, pipeline 660 may provide an authentication result indicating whether the authentication was successful or failed. Such an authentication result may be used, for example, to grant use of cryptographic keys 132 discussed above.

Example Applications

Figure 7:
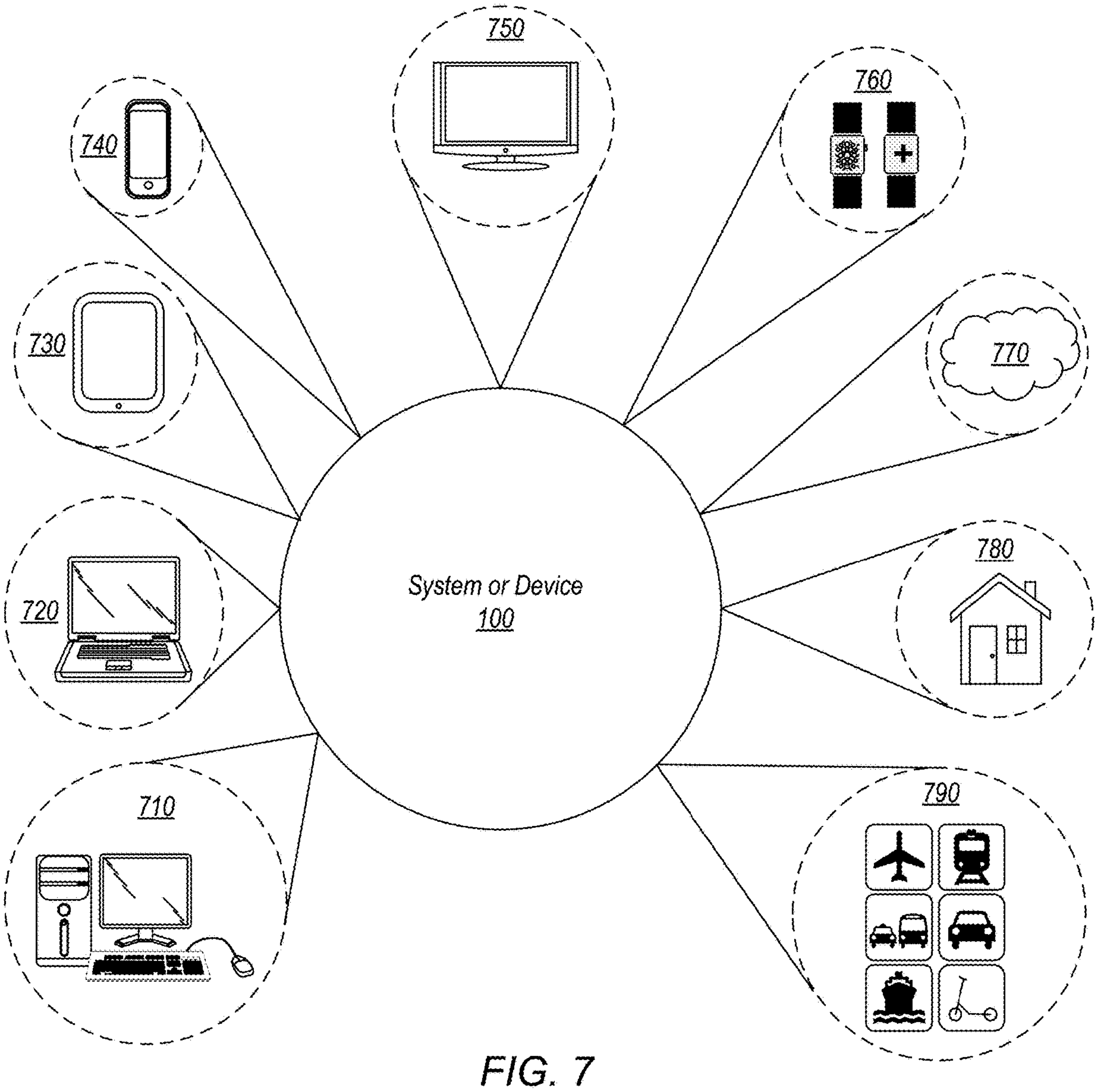
FIG. 7 is a diagram illustrating example uses for systems and devices implementing functionality described herein, in accordance with some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 100 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 100 may also be used in various other contexts. For example, system or device 100 may be utilized in the context of a server computer system, such as a dedicated server or on shared hardware that implements a cloud-based service 770. Still further, system or device 100 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

What is claimed is:

1. A non-transitory computer readable medium having program instructions stored therein that are executable by a device to perform operations comprising:

receiving, from a browser via a key-management Application Programming Interface (API) supported by the device, a request for a browser session to receive access to a cryptographic key managed by the device, wherein the request is associated with a signed attestation from a server corresponding to the browser session;

the key-management API of the device determining whether to grant the browser session access to the cryptographic key based on a verification of the signed attestation using metadata stored about the cryptographic key; and based on the determining to grant, providing access to the cryptographic key via the key-management API.

2. The computer readable medium of claim 1, wherein providing access to the cryptographic key includes performing a requested cryptographic operation using the cryptographic key and without providing the cryptographic key to the browser.

3. The computer readable medium of claim 1, wherein the operations further comprise:

generating a certified public key pair having a certificate that includes a public key of the public key pair, wherein the cryptographic key is a private key of the public key pair; and wherein providing access to the cryptographic key includes:

using the private key to perform a cryptographic operation requested via the key-management API; and returning, to the browser, a result of the cryptographic operation.

4. The computer readable medium of claim 1, wherein the key-management API is integrated into an operating system that manages the cryptographic key.

5. The computer readable medium of claim 1, wherein the operations further comprise:

storing the cryptographic key in a secure element configured to provide access to the cryptographic key via the key-management API.

6. The computer readable medium of claim 1, wherein the API request includes the signed attestation; and wherein the determining includes the key-management API performing the verification of the signed attestation.

7. The computer readable medium of claim 1, wherein providing access to the cryptographic key includes the device permitting access to only a particular browser tab associated with the browser session.

8. The computer readable medium of claim 1, wherein the operations further comprise:

distributing the cryptographic key from the device to one or more additional devices associated with a user of the device.

9. The computer readable medium of claim 1, wherein the operations further comprise:

performing a key recovery operation for the cryptographic key based on another cryptographic key stored on another device associated with a user of the device.

10. The computer readable medium of claim 1, wherein the operations further comprise:

in response to receiving the request, providing a corresponding notification to a user of the device.

11. A device, comprising:

one or more processors; and memory having program instructions stored therein that are executable by the one or more processors to cause the device to perform operations that include:

receiving, from a browser via a key-management Application Programming Interface (API) supported by the device, a request for a browser session to receive access to a cryptographic key managed by the device, wherein the request is associated with a signed attestation from a server corresponding to the browser session;

the key-management API of the device determining whether to grant the browser session access to the cryptographic key based on a verification of the signed attestation using metadata stored about the cryptographic key; and based on the determining to grant, providing access to the cryptographic key via the key-management API.

12. The device of claim 11, wherein the operations include:

creating the cryptographic key in response to a key creation request received via the key-management API, wherein the creating includes storing contextual information restricting when the cryptographic key can be used.

13. The device of claim 11, wherein the operations include:

permitting, via the key-management API, a browser session to access a cryptographic key established by a separate application than the browser.

14. The device of claim 11, wherein the signed attestation is associated with a certificate bound to the cryptographic key at creation of the cryptographic key.

15. The device of claim 11, wherein the determining is further based on a user authentication of a user of the device.

16. A method, comprising:

a device receiving, from a browser via a key-management Application Programming Interface (API) supported by the device, a request for a browser session to receive access to a cryptographic key managed by the device, wherein the request is associated with a signed attestation from a server corresponding to the browser session;

the key-management API of the device determining whether to grant the browser session access to the cryptographic key based on a verification of the signed attestation using metadata stored about the cryptographic key; and based on the determining to grant, the device providing access to the cryptographic key via the key-management API.

17. The method of claim 16, wherein the cryptographic key is managed by an operating system of the device.

18. The method of claim 16, wherein the cryptographic key is managed by hardware of the device.

19. The method of claim 16, wherein the verification is a second verification of the attestation performed by the device in addition to a verification performed by the browser.

20. The method of claim 16, wherein providing access to the cryptographic key includes using the cryptographic key to perform an action requested by the browser without providing the cryptographic key to the browser.

* * * * *